United States Patent

Bowers

[15] 3,693,590

[45] Sept. 26, 1972

[54] ANIMAL CONDITIONED AVOIDANCE APPARATUS

[72] Inventor: John C. Bowers, Wilmington, Del.
[73] Assignee: Bowers Instrument Company
[22] Filed: April 21, 1971
[21] Appl. No.: 135,920

[52] U.S. Cl. ................... 119/1, 119/29, 128/2 N, 128/2 S
[51] Int. Cl. ............................................. A01k 45/00
[58] Field of Search ....128/1, 2 R, 2 N, 2 S; 35/22 R; 119/15, 29, 1; 273/86 R

[56] References Cited

UNITED STATES PATENTS

| | | | |
|---|---|---|---|
| 3,540,413 | 11/1970 | Castaigne | 119/1 |
| 3,100,473 | 8/1963 | Kissel | 119/1 |
| 3,304,911 | 2/1967 | Hakata et al. | 119/1 |
| 3,494,329 | 2/1970 | Frieberger et al. | 119/1 |
| 3,439,358 | 4/1969 | Salmons | 128/2 S UX |

Primary Examiner—Kyle L. Howell
Attorney—Mortenson & Weigel

[57] ABSTRACT

The apparatus disclosed includes a cage having a surface on which a small animal can stand. The surface includes a mechanism for stimulating, by means of an electrical shock or otherwise, the animal into activity such that the animal jumps into a nearby escape unit. A sensor detects the animals entry into the escape unit. Counters responsive to the sensors and to the energizing means determine whether the animal has entered into the escape unit prior to or subsequent to the application of the stimulus. An automatic device cuts off the unit in the event the animal does not respond at all to this stimulus after a predetermined number of times. This apparatus permits the characteristic effects of toxic products, mental retardation, various drugs, other pharmaceuticals and the like to be studied entirely automatically without the need for continuously monitoring the operation by a human operator.

10 Claims, 7 Drawing Figures

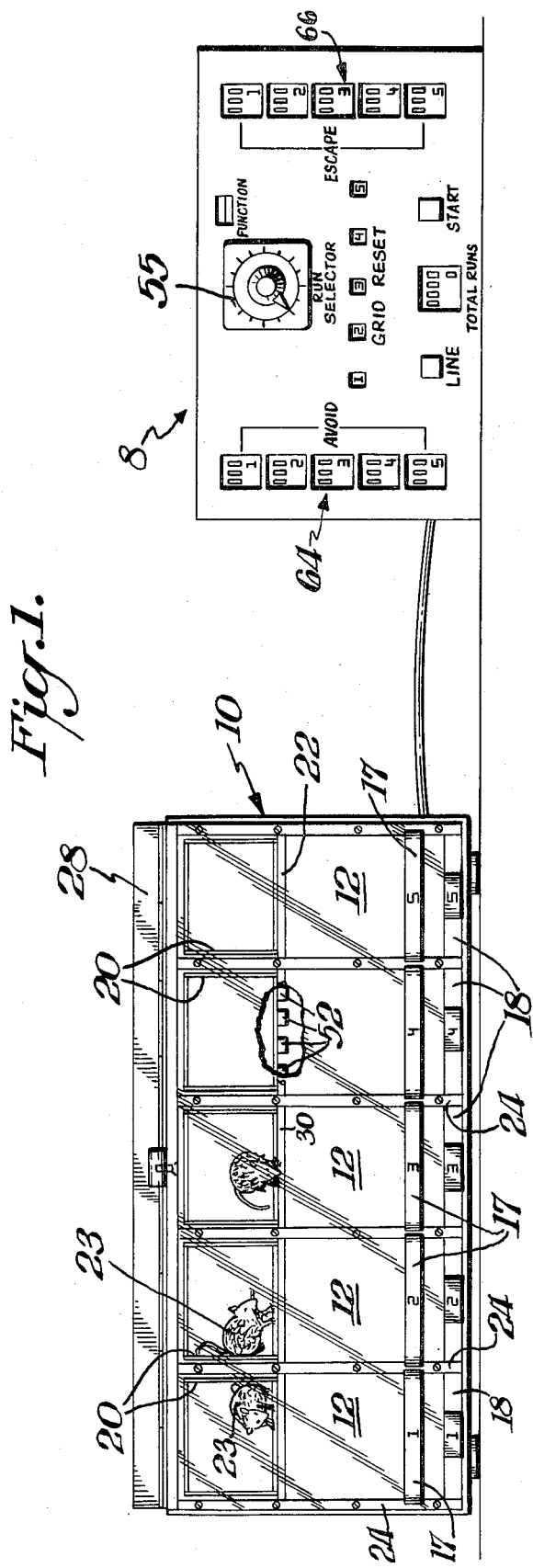

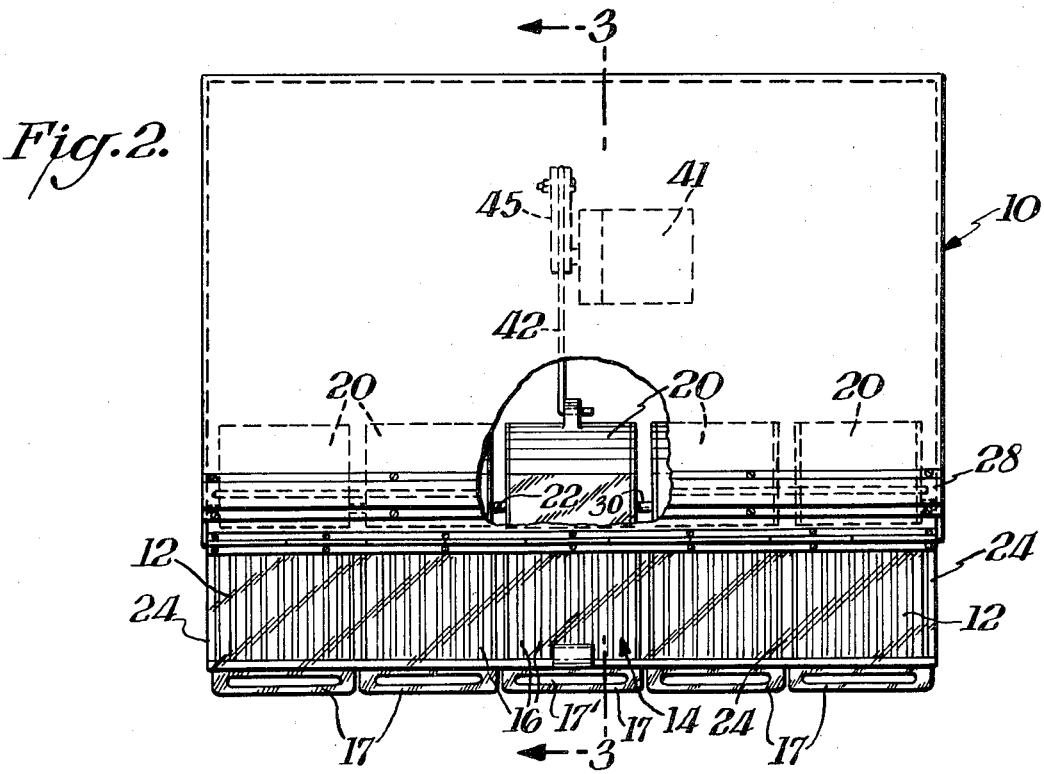
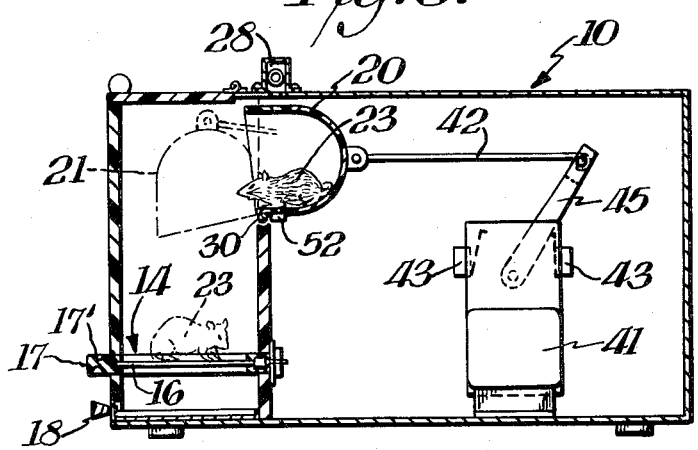

INVENTOR
John C. Bowers
BY Mortenson and Weigel
ATTORNEYS

ANIMAL CONDITIONED AVOIDANCE APPARATUS

BACKGROUND OF THE INVENTION

It is customary with drug manufactures and others to study the effect of sensory stimulants applied to small animals so as to determine the response of such animals to the stimuli under various reproducible conditions. These conditions may include exposure of the animals to various toxic and other products such as gases, drugs or medicines as well as simply studying mental conditions; learning rates and the host of other experiments typically run using the responses of small animals to various stimuli. Most of the devices presently employed require the presence of a human operator who laboriously will push buttons to apply the stimulus and then manually observe and record the response of the animal to the stimulus. This is time consuming to say the least and difficult to reproduce because of the subjective inaccuracies inherent in any human observer.

It would be far more desireable to have an automatic device that is capable of repetitively applying a program of stimuli over an extended period of time to various small animals and to then record the response of the animals to such stimuli automatically without the intercession of the human factor. At the same time it is desireable that any device that employs stimuli such as electrical shocks include protective mechanism such as not to cause inhumane treatment to the animals under test. Therefore, some device must be provide such that if the animals do not respond to the stimuli over a certain period of time the test must automatically be aborted.

It is, therefore, an object of this invention to obviate many of the disadvantages inherent in the prior art animal stimuli testing apparatus.

Another object of this invention is to provide an improved apparatus for automatically determining the response of animals to various stimuli over extended periods of time.

Still another object of this invention is to provide an improved apparatus that is capable of automatically monitoring the response of animals to various stimuli.

BRIEF DESCRIPTION OF THE PREFERRED EMBODIMENT

In a preferred embodiment, the apparatus of this invention is adapted to test the response of an animal or animals to a stimulus. The apparatus includes a cage having a surface on which the animal can stand, having means for effecting the stimulus, an escape region near the stimulus effecting means but separated therefrom, sensing means for sensing the entry of the animal into the escape region, energizing means for periodically energizing the stimulus effecting means thereby to stimulate the movement of the animal from the surface into the escape region whereby such movement or lack thereof can be sensed with the sensing means, and means for periodically expelling an animal from the escape region back onto the surface.

There is also desirably included in the apparatus counting means responsive to the sensing means and to the energizing means for counting the number of times an animal escapes from the surface prior to the application of the stimulus and additional counting means also responsive to the sensing means and to the energizing means for counting the numbers of times an animal escapes from the surface after the application of the stimulus. A humane mechanism is also included to disable the energizing means in response to the sensing means and the energizing means, in the event of the non-entry of an animal into the escape region after a predetermined number of applications of the stimulus.

BRIEF DESCRIPTION OF THE DRAWINGS

The novel features that are considered characteristic of this invention are set forth with particularity in the appended claims. The invention, itself, however, both as to its organization and method, as well as additional objects and advantages thereof, will best be understood from the following description when read in connection with the accompanying drawings, in which:

FIG. 1 is a front elevation view of an apparatus for testing the response of an animal to stimulus constructed in accordance with this invention;

FIG. 2 is a top plan view of the apparatus illustrated in FIG. 1 particularly depicting the relationship between the stimulus effecting means and the escape region;

FIG. 3 is a cross-sectional view taken along the section line 3—3 of FIG. 2 depicting the particular details of the dumper operating mechanism;

DESCRIPTION OF THE PREFERRED EMBODIMENT

Figure 5:
FIG. 5 is a plan view of the plug in type surface used to stimulate.

With reference particularly to FIGS. 1 through 3, there is seen a control housing 8 and an instrument housing 10 in the front portion of which are formed, in this case, five separate cage and dumper sections 12, each being substantially identical in construction. Each of the sections 12 is seen to include a surface 14 which incorporates therein means to effect a stimulus for causing an animal to move or not to move depending upon its reaction to the stimuli. In a preferred embodiment of this invention, the surface 14 is comprised of a plurality of electrically conductive elements or wires 16 (FIG. 5) which may be simultaneously or sequentially energized in any desired random pattern with an alternating or direct current voltage to provide the necessary stimulus. Typically, a voltage in the order of somewhere between 0 and 1,000 volts with a low current typically in the range of 2 milliamps is desireably employed from any suitable high voltage source. This random energization of the several conductors 16 is particularly desireable since this prevents the animal from learning the sequence and performing a "dance" so as to avoid the electrical shock.

Alternative methods of stimulating the animal will include the generation of noise, vibrating the surface in various modes and amplitudes, applying various wave lengths and intensities of flashing lights, or applying heat stimulus to the surface. The separate spaced electrical conductive elements 16 are also preferred since they form a natural grating through which droppings from the animal may pass into a waste collecting tray 18 in the form of a sliding drawer which fits immediately below each cage and dumper section 12. The details of a particular surface are seen most clearly in FIG. 5 which depicts a plug-in type array of electrical conductors 16 held by a frame 17 having a finger grip 17. The plug-in surface 14 is adapted to slide in grooves formed in the cage walls 24.

A typical cage size is in the general form of a hollow, rectangular solid 4 by 4 inches and 8 inches in height. In the upper portion of each cage and dumper section 12 is an escape region which is illustrated as being in the form of a dumper or bucket 20. More specifically, the dumper 20 is a hollow, semi-cylindrical device closed at either end and placed upon its side such that its access is through a vertically disposed rectangular opening. Preferably the dumper 20 is pivoted at its front edge at the points 22 by pivots inserted into receptacles in the cage walls 24 to permit the dumper 20 to be rotated forwardly and down as depicted in phantom 21 in FIG. 3 so as to expell or discharge any animal 23 resting therein downwardly onto the surface 14. Although any suitable dumper 20 may be designed, this generally semi-circular design configuration has proven quite satisfactory.

In alternative embodiments the dumper 20, however, may be rectangular or it may be merely a platform which pivotally dumps the animal downwardly to the surface. In still other embodiments (FIG. 7) a solenoid or other prime mover 40 actuated pusher element 27 may be used to literally push the animal from the floor of the dumper 20 until he falls down onto the surface 14 of the cage. Furthermore, when particularly small animals are employed, the back portion of the semi-circular dumper element may be blocked off (FIG. 6) by any suitable plug-in device, as described hereinafter, so as to reduce the volume available.

A sensor or sensing means 26 (FIG. 4) is incorporated into the lower front floor or surface of the dumper 20 so as to detect the entry and/or departure of an animal from the escape region (dumper). In a preferred embodiment of the invention, the sensing means is in the form of a photoconductive strip which is energized by a suitable light source 28 placed above and somewhat to the front of the dumper 20. The dumper itself preferably is formed of any suitable transparent plastic to permit light to pass downwardly through to the photoconductive strip 26. Thus, when the animal leaps from the lower surface 14 under the stimulus applied thereto, as will be described hereinafter, his body blocking the light from the light source 28 causes a detectable change in the photoresistance of the photoconductive element 26 which may be amplified and detected by the system set forth in FIG. 4. Alternatively the sensing means may be a photovoltaic cell or other photodetective means. In still other alternative embodiments, radar, sonar or any other proximity type detector or their equivalent may be employed.

As noted hereinbefore, all of the five cages illustrated are substantially identical in construction and the dumpers 20 in each cage are ganged together by the rod or strip 30 and adapted to be simultaneously pivoted about their pivots 22 by a suitable prime mover 40. In the embodiment illustrated, this prime mover is simply an electric motor 41 driving a pivot arm 45 which drives linkage 42. The motor operation is controlled by microswitches 43 when energized so as to move the arm 45 forward (to the front) until a limit microswitch 43 is hit at which time the motor is reversed until it returns to its starting point and is disabled by a cut-off microswitch 43. Alternatively, a solenoid may be employed or suitable air cylinders or other known prime movers may be employed as desired.

Figure 4:
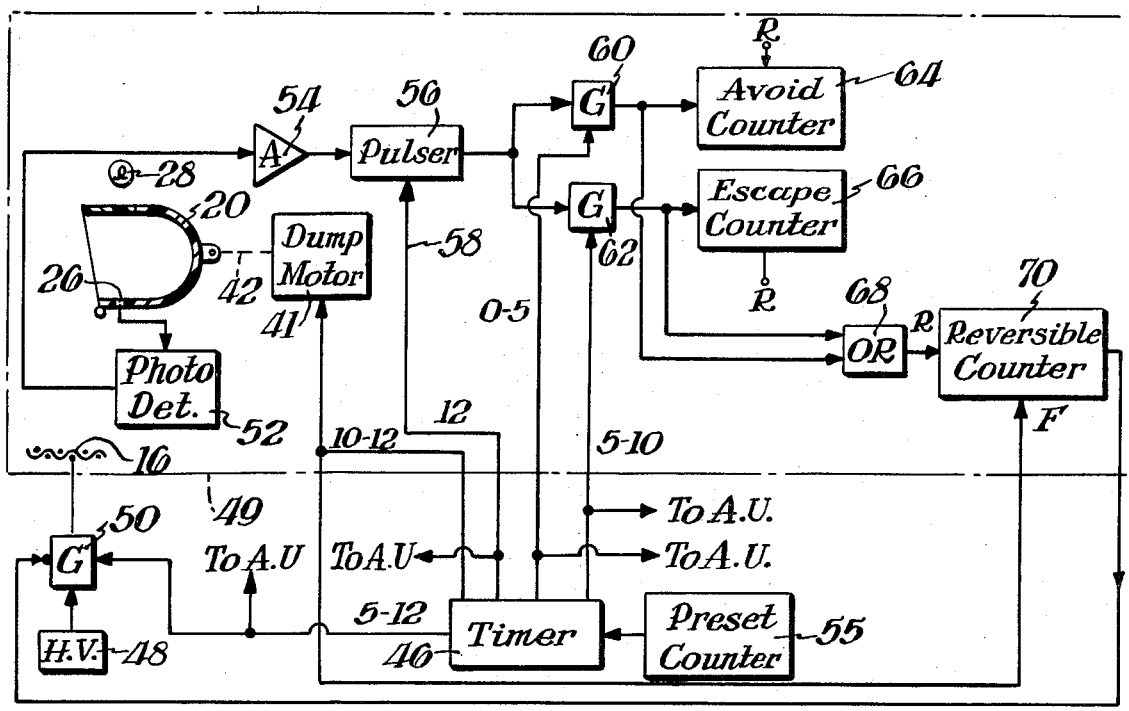
FIG. 4 is a block diagram illustrating the electrical control circuitry necessary to operate the apparatus illustrated in FIG. 1 with provisions being made for the appropriate read-outs.

This prime mover which is seen as denoted by the block 41 in FIG. 4 is seen to act through the linkage denoted by the dashed line 42 to operate the dumper 20 which is pivoted on the pivot 22. The motor 41 is controlled by a timer mechanism, which is illustrated by the block 46 housed in cabinet 8. This timer 46 may be any conventional timer such as a cam timer which under the control of cams selectively operates various switches to apply electrical energy from a suitable source of potential to the various elements. In the preferred embodiment, the cam timer 46 operates utilizing six separate cams, one of which controls the total run time, which in this instance is established at 12 seconds (other cycle or run times may be selected), a second cam controls the operation of the dumper 20 to be actuated within the 10 to 12 second period of the cycle, a third cam operates photoconductor circuits so that they are energized for the first 10 seconds of each cycle. A fourth cam controls the operation of the counter circuits to be described, an avoid counter 64 being energized during the first 5 seconds of the cycle and the escape counter 66 being energized during the second 5 seconds of each cycle. A fifth cam resets a pulser 56 at the end of each cycle, the pulser being used to actuate the several counters, and finally a sixth cam operates the high voltage relay during the second 5 second period of each cycle. The timer control signals are applied simultaneously to the several counter and high voltage circuits as denoted by the arrows labelled "To A. U.", i.e., to all units, for each of the five cages utilized in the preferred embodiment. These circuits are illustrated as being within the rectangle 49. Like circuits for each cage and dumper are illustrated by the rectangles 51. A preset counter 55 controls the number of cycles made by the timer 46 simply by counting the number of rotations of the cam timer. Other known controllers of this type are available commercially.

Thus, only the detail of one of these sets of circuits is shown and described, that being those elements within the rectangle 49. It is seen that a source of high voltage 48 is allowed to pass through a gate 50 which may be a relay or other suitable known device. The output of the gate 50 passes the high voltage on to the electrical conductors 16. The photoconductive element 26 is connected to a photodetector 52 which preferably may include a comparison circuit so that a change in resistance level is denoted and passed as an output signal to an amplifier 54 for amplification and thence to a suitable pulser 56 for conversion of the signal into a distinct pulse after which the pulser is disabled for the remainder of the cycle until it is reset at the end of the cycle by a pulse delivered along the line 58 from the timer 46. A suitable pulser, for example, may be a oneshot multivibrator or alternatively may be a conventional oneshot relay such as that sold by Automatic Timing and Controls, Inc., King of Prussia, Pa., Part No. 721027012. In like manner, the photoelectric amplifier also is available from the same company and is available under the part designation 721027002.

The output of the pulser 56 which is now a single pulse, indicative of the animal crossing into the dumper, each 12 second cycle of the instrument operation, is passed a pair of gates 60 and 62 which pass the single pulse respectively to an avoid counter 64 and an escape counter 66. The escape counter gate 60 is energized during the first 5 seconds of each cycle by the timer 46 and the escape counter gate 62 is energized during the second 5 second period of each cycle. Thus, the avoid counter 64 will count only those occurrences wherein the animal has been able to depart from the surface 14 prior to the stimulus whereas the escape counter will totalize those times in which the animal departs from the surface 14 only after the application of the stimulus. Each of the counters 64 and 66 has a reset input, which may be manual, which is actuated only at the end of the entire test sequence by the operator. The output of each of the gates 60 and 62 is also coupled through a conventional OR circuit 68 to the reverse counting input of a conventional reversible counter 70. This counter is also actuated at the end of each 12 second cycle by a signal from the timer 46 such that each cycle the counter will count up one and, if the animal has either avoided the stimulus or escaped as a result of the stimulus, will count baCk down by 1. The counter is set to overflow at 10 counts to provide an inhibit signal to the gate 50 so as to disconnect the high voltage for that particular cage in which any animal has not responded to or avoided the stimulus for 10 successive cycles. This humane protection device is placed in the apparatus in the event that an animal becomes so drugged or shocked or frightened as to be utterly incapable of avoidance or escape.

The operation of the device may be described as follows. For the sake of simplicity it will be assumed that the instrument is operated utilizing mice as illustrated. After the instrument is turned on, the first 5 seconds is a delay period at which time no shock is present. Immediately following is a 5 second shock period, during which time a voltage is applied across the electrical conductors 16. This shock can be varied over a range of from 0 to 1,000 volts. Usually the amperage is kept at approximately the 2 ma. level. At the end of the shock period which occurs after 10 seconds, the dumper rotates forward 90° and then back to the starting position. This sequence takes two seconds for completion. Immediately upon the return of the dumper to the starting position, a new cycle begins. The instrument may be preset to complete any number of runs.

The front panel of the console 8 (FIG. 1) contains a preset counter 55 which can be set for any desired number of runs. To the left of the preset counter will be found five totalizing avoid counters, one for each cage, which indicate the number of avoidances made by each mouse. To the right side of the console 8 are five additional totalizing escape counters which indicate the number of escapes made by the mouse. Both the escape and the avoidance counters are activated by the sensor 26 which, in turn, is triggered by the action of the mouse's body passing over the rim of the dumper.

A humane factor is built into the instrument to protect the mouse from excessive electrical shock. Should the animal fail to jump from the cage into the dumper for 10 consecutive runs, all electrical power will be cutoff from the respective grid during the remaining runs of the test and a pushbutton light will be turned on. When all runs have been terminated, the grid pushbutton light may be depressed, placing the respective grid back into circuit, at which time the light will go out.

After the total number of preset runs are completed, all counts will be retained on the respective avoidance and escape counters. The counters must be cleared manually rather than by an electrical reset function, therefore, the readings on the counters cannot accidentally be cleared by starting a new series of runs.

Figure 6:
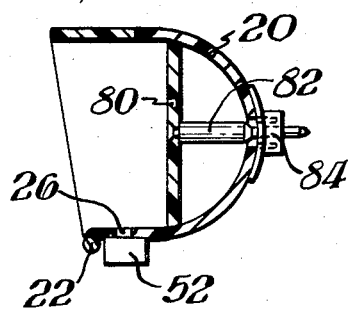
FIG. 6 is a partial sectional view of a modification of the dumper mechanism.

In alternative embodiments of the invention there is seen in FIG. 6 a dumper utilizing a banana type plug-in unit so as to reduce the volume of the dumper 20. This unit includes a back panel 80 mounted on a male-type plug 82 which is adapted to be inserted into a suitable receptacle 84 at the rear of the dumper 20. This assures that a small animal such as a mouse will be positioned properly over the sensing element 26.

Figure 7:
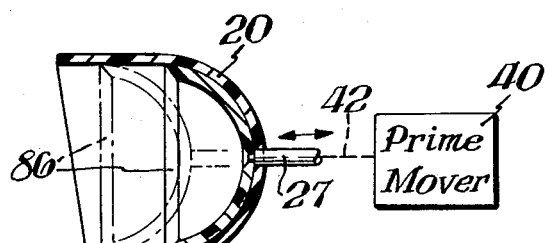
FIG. 7 is a partial sectional view of still another modification of the dumper mechanism.

In another alternative embodiment of the invention illustrated in FIG. 7, the dumper 20 is fixed in position to the cage itself. In this insatnce, a pusher member 86 which forms the back wall of the dumper chamber 20, is adapted to be reciprocally moved front and back by the prime mover 40 operating through the linkage 42. In this embodiment the mouse is literally pushed off the floor of the dumper 20 and thereby "dumped" to the surface 14 of the cage for re-stimulus during the next cycle.

There has thus been described a relatively simple animal conditioned avoidance apparatus which is totally automatic in operation, economical to construct, capable of providing reproducible results in testing the response of animals to various stimuli.

It is obvious that many embodiments may be made of this inventive concept, and that many modifications may be made in the embodiments hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims.

What is claimed is:

1. Apparatus for testing the response of an animal to a stimulus comprising:
    an enclosure including a surface having means for effecting said stimulus,
    an escape region within said enclosure, said escape region being near said stimulus means but separated therefrom,
    sensing means for sensing the entry of an animal into said escape region,
    energizing means for periodically energizing said means for effecting said stimulus thereby to stimulate the movement of the animal from the surface into the escape region, whereby such movement or lack thereof can be sensed with the sensing means, and expelling means for periodically expelling an animal from the escape region on to said surface.

2. Apparatus according to claim 1 which also includes escape counting means responsive to the sensing means and to the energizing means for counting the number of times an animal escapes from said surface prior to the application of said stimulus.

3. Apparatus according to claim 1 which also includes avoidance counting means responsive to the sensing means and to the energizing means for counting the number of times an animal escapes from said surface after the application of said stimulus.

4. Apparatus according to claim 1 which also includes means to disable the energizing means in response to the sensing means and to the expelling means for sensing the non-entry of the animal into the escape region after a predetermined number of applications of said stimulus.

5. Apparatus according to claim 1 which also includes:
total counting means responsive to the sensing means and to the energizing means for counting the number of times an animal escapes from said surface both prior to the application of said stimulus and after the application of said stimulus.

6. Apparatus according to claim 5 wherein said total counting means is responsive to said energizing means to disable the energizing means in the event of the non-entry of the animal into the escape region after a predetermined number of applications of said stimulus.

7. Apparatus according to claim 1 wherein said escape region is in the general form of a bucket pivotally mounted to a portion of said enclosure and adapted to dump the animal to said surface.

8. Apparatus according to claim 1 wherein said sensing means includes a photoelectrical detector.

9. Apparatus according to claim 1 wherein said expelling means is a hollow, semi-cylindrical unit pivoted at its lower edge to a portion of said enclosure and includes a photoconductive element adapted to detect the movement of any animal thereacross.

10. Apparatus according to claim 1 wherein said means for effecting said stimulus includes electrical conductive elements in said surface, and said energizing means includes means for applying an electrical potential across said electrodes.

* * * * *